(12) United States Patent
Krouse et al.

(10) Patent No.: US 8,307,348 B2
(45) Date of Patent: Nov. 6, 2012

(54) SIMPLIFIED REPRESENTATION OF XML SCHEMA STRUCTURES

(75) Inventors: Kevin Krouse, Seattle, WA (US); Stanislav Kitsis, Snoqualmie, WA (US)

(73) Assignee: Microsoft Corporation, Redmond, WA (US)

( * ) Notice: Subject to any disclaimer, the term of this patent is extended or adjusted under 35 U.S.C. 154(b) by 1112 days.

(21) Appl. No.: 11/770,704

(22) Filed: Jun. 28, 2007

(65) Prior Publication Data

US 2008/0134139 A1 Jun. 5, 2008

Related U.S. Application Data

(60) Provisional application No. 60/868,676, filed on Dec. 5, 2006.

(51) Int. Cl.
*G06F 9/45* (2006.01)
(52) U.S. Cl. ........................................................ 717/136
(58) Field of Classification Search ................... 717/136, 717/104, 117, 137; 707/803
See application file for complete search history.

(56) References Cited

U.S. PATENT DOCUMENTS

| | | | |
|---|---|---|---|
| 6,871,204 B2 * | 3/2005 | Krishnaprasad et al. ............. 1/1 | |
| 7,043,487 B2 | 5/2006 | Krishnamurthy et al. | |
| 7,096,422 B2 | 8/2006 | Rothschiller et al. | |
| 7,143,346 B2 | 11/2006 | Dunne et al. | |
| 7,188,332 B2 | 3/2007 | Charisius et al. | |
| 7,721,270 B2 * | 5/2010 | Ukelson et al. ............... 717/136 | |
| 2001/0044811 A1 * | 11/2001 | Ballantyne et al. ............ 707/513 | |
| 2003/0140308 A1 * | 7/2003 | Murthy et al. ................. 715/500 | |
| 2003/0204481 A1 | 10/2003 | Lau | |
| 2004/0083453 A1 | 4/2004 | Knight et al. | |
| 2004/0199905 A1 * | 10/2004 | Fagin et al. .................... 717/136 | |
| 2005/0050056 A1 | 3/2005 | Idicula et al. | |
| 2005/0154978 A1 | 7/2005 | Albornoz et al. | |
| 2005/0198617 A1 * | 9/2005 | Kim et al. ....................... 717/109 | |
| 2005/0257193 A1 * | 11/2005 | Falk et al. ...................... 717/109 | |
| 2006/0041838 A1 | 2/2006 | Khan | |
| 2006/0173865 A1 * | 8/2006 | Fong ............................... 707/100 | |
| 2006/0179421 A1 * | 8/2006 | Bielski et al. ................. 717/115 | |
| 2007/0011178 A1 | 1/2007 | Dumitru et al. | |
| 2007/0028221 A1 * | 2/2007 | Ukelson et al. ............... 717/136 | |
| 2008/0154939 A1 * | 6/2008 | Mutschler et al. ............ 707/102 | |

OTHER PUBLICATIONS

Eric Wilde, et al. SPath: A Path Language for XML Schema. ACM 978-1-59593-654-7/07/0005. WWW 2007. May 8-12, 2007, Banff, Alberta, Canada. http://www.cs.bell-labs.com/cm/cs/who/pfps/temp/web/www2007.org/posters/poster904.pdf. Last accessed Apr. 23, 2007.

Jerome Simeon, et al. The Essence of XML. ACM 1581136285/03/0001. POPL'03, Jan. 15-17, 2003, New Orleans, Louisiana, USA. http://delivery.acm.org/10.1145/610000/604132/p1-simeon.pdf?key1=604132&key2=3730237711&coll=GUIDE&dl=GUIDE&CFID=17132653&CFTOKEN=62804943. Last accessed Apr. 23, 2007.

Nicholas Routledge, et al. UML and XML Schema. Australasian Database Conference 2002. vol. 5. Xiaofang Zhou, Ed. http://delivery.acm.org/10.1145/570000/563924/p157-routledge.pdf?key1=563924&key2=6702237711&coll=GUIDE&dl=GUIDE&CFID=17286036&CFTOKEN=40030580.

* cited by examiner

*Primary Examiner* — Anna Deng
(74) *Attorney, Agent, or Firm* — Zete Law, P.L.L.C.; MacLane C. Key

(57) ABSTRACT

A software development system and method are provided. The system includes a transform component to convert a schema file into a simplified graphical data representation that coincides with a data representation associated with an underlying instance document. A viewing component displays the simplified graphical data representation.

18 Claims, 10 Drawing Sheets

PRIOR ART XSD FILE                                          ─ 400

```
schema
  annotation
    documentation                                    ← 410
  element purchaseOrder (of type PurchaseOrderType)
  element comment (of type string)       ← 420
  complexType PurchaseOrderType
    sequence
      element shipTo (of type Address)
      element billTo (of type Address)
      element comment (of type ref)
      element items (of type Items)
    attribute orderDate          ─ 430
  complexType Address
    sequence
      element name (of type string)
      element street (of type string)
      element city (of type string)
      choice ←── 440
        sequence
          element province (of type string)
          element postalcode (of type string)
        sequence
          element county (of type string)
          element postcode (of type string)
        sequence
          element state (of type string)
          element zip (of type positiveInteger)
    attribute country           ─ 450
  complexType Items
    sequence
      element item
        complexType      ← 460
          sequence
            element productName (of type string)
            element quantity
              simpleType
                restriction (of type positiveInteger)
                  maxExclusive
            element USPrice (of type decimal)
            element comment (of type ref)
            element shipDate (of type date)
          attribute partNum (of type SKU)
  simpleType SKU
    restriction (of type string)
      pattern
```

FIG. 4

SIMPLIFIED XML SCHEMA STRUCTURE    ⟵ 500

```
element purchaseOrder (of type PurchaseOrderType)
   attribute orderDate
   element shipTo (of type Address) ⟵ 510
      element name (of type string)
      element street (of type string)
      element city (of type string)
      element province (of type string) ⟵ 520
      element postalcode (of type string)
      element county (of type string) ⟵ 530
      element postcode (of type string)
      element state (of type string) ⟵ 540
      element zip (of type positiveInteger)
   element billTo (of type Address) ⟵ 550
      element name (of type string)
      element street (of type string)
      element city (of type string)
      element province (of type string)
      element postalcode (of type string)
      element county (of type string)
      element postcode (of type string)
      element state (of type string)
      element zip (of type positiveInteger)
   element comment (of type string) ⟵ 560
   element items (of type Items)
      element item (sequence) ⟵ 570
         attribute partNum (of type SKU)
         element productName (of type string)
         element quantity (restricted to positiveInteger)
         element USPrice (of type decimal)
         element comment (optional, of type string)
         element shipDate (optional, of type date)
```

FIG. 5

SIMPLIFIED XML SCHEMA STRUCTURE
WITH COMPOSITORS SHOWN       ─ 600

```
element purchaseOrder (of type PurchaseOrderType)
  attribute orderDate
  element shipTo (of type Address)
   ─ 610    element name (of type string)
            element street (of type string)
            element city (of type string)
            . element province (of type string)
   620   s. element postalcode (of type string)
            . element county (of type string)
            s. element postcode (of type string)
            . element state (of type string)
            s. element zip (of type positiveInteger)
  element billTo (of type Address)
            element name (of type string)
            element street (of type string)
            element city (of type string)
            . element province (of type string)
            s. element postalcode (of type string)
            . element county (of type string)
            s. element postcode (of type string)
            . element state (of type string)
            s. element zip (of type positiveInteger)
  element comment (of type string)
  element items (of type Items)
    element item
      attribute partNum (of type SKU)
      element productName (of type string)
      element quantity (of type string)
      element USPrice (of type decimal)
      element comment (optional, of type string)
      element shipDate (optional, of type date)
```

FIG. 6

EXAMPLE XML FILE 700

```xml
<?xml version="1.0"?>
<purchaseOrder orderDate="1999-10-20">
   <shipTo>
      <name>Alice Smith</name>
      <street>123 Maple Street</street>
      <city>Mill Valley</city>
      <state>CA</state>
      <zip>90952</zip>
   </shipTo>
   <billTo>
      <name>Robert Smith</name>
      <street>8 Oak Avenue</street>
      <street>Apt. #3-A</street>
      <city>Old Town</city>
      <province>BC</province>
      <postalcode>V6B 1H6</postalcode>
   </billTo>
   <comment>Hurry, my lawn is going wild!</comment>
   <items>
      <item partNum="872-AA">
         <productName>Lawnmower</productName>
         <quantity>1</quantity>
         <USPrice>148.95</USPrice>
         <comment>Confirm this is electric</comment>
      </item>
      <item partNum="926-AA">
         <productName>Baby Monitor</productName>
         <quantity>1</quantity>
         <USPrice>39.98</USPrice>
         <shipDate>1999-05-21</shipDate>
      </item>
   </items>
</purchaseOrder>
```

FIG. 7

SIMPLIFIED REPRESENTATION OF XML SCHEMA STRUCTURES

CROSS REFERENCE TO RELATED APPLICATION

This application claims the benefit of U.S. Provisional Patent Application Ser. No. 60/868,676 filed on Dec. 5, 2006, entitled "SCHEMA STRUCTURE TRANSFORMATION" the entirety of which is incorporated herein by reference.

BACKGROUND

Extensible Markup Language (XML) is a common data language employed for various applications such as website development and other applications typically designed for the Internet. Generally, XML is considered a markup language for documents containing structured information. Structured information includes both content (words, pictures, and so forth) and some indication of what role that content plays (for example, content in a section heading has a different meaning from content in a footnote, which means something different than content in a figure caption or content in a database table, and so forth). Almost all documents have some structure. Thus, a markup language such as XML provides a mechanism to identify structures in a document, where the XML specification defines a standard way to add markup to documents. Another aspect of XML is referred to as XSD which is an XML based language that defines validation rules for XML files, where XSD can be employed for XML Schema Definition. Generally, XSD is an XML based language which implies that XSD statements are written in XML files. One important function of XSD is that it defines validation rules for XML files, meaning that XSD can be utilized to replace Document Type Definitions (DTD), which is another language for defining XML validation rules.

Since the structure of XML files and XSD definitions is defined by textual data and statements, tools for manipulating such languages have not developed along a similar path such as traditional code-based models for developing source code for example. For instance, code-based models typically operate with object classes where tools have developed over time to create desired software functionality. Although XML and XSD type declarations may have some similarity to previous code-based models and class structures, the differences with code-based models are such that XML/XSD tools over the last several years have developed according to a different path offering different types of functionality than code-based tools.

In one case, W3C XML is a general-purpose markup language used to encode data in a structured, human-readable format that can be understood & authored by both people and computers. By itself, XML imposes no predefined structure—the structure of the data is left to the producer and consumer to agree on. In another case, XML Schema is an XML language that can be used to describe those XML structures and the constraints on respective contents in a formal way, so that producers and consumers can have an explicit, well-defined metadata contract for data exchange. Since this formal description (e.g., metadata) is itself XML, it can be produced, consumed & manipulated with the same APIs and tools that are used for the XML the metadata describes.

In another aspect, XML Schema is a complex language with many details and nuances. While many developers are familiar with the use of XML to encode data, far fewer of them are familiar with the syntax and use of XML Schema to describe the metadata. Also, some tend to think in terms of the structure of the data that the schema is describing, yet they are required to express this structure using the XML Schema language which has a different and only loosely related structure. Existing Graphical User Interface (GUI) tools for working with XML Schema files typically provide a direct graphical representation of the contents of the XML Schema, not the structure of the XML data it describes. Since many developers tend to think in terms of their own data, not the minutia of the XML schema language, this makes the XML schema difficult to understand and produce.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

A developer tool and interface is provided that transforms data in one representation to a simplified graphical view that is structured to data associated with an underlying instance document. A graphical representation of data in a schema format, for example, is provided that mirrors or conforms to the shape of XML data the schema describes. This provides a simplified view of the schema by removing extraneous details (i.e., visual "noise") relating to the XML Schema language. By simplifying the view in this manner, a developer can quickly observe an overview of what the XML Schema describes and then drill down into the nuances of the XML Schema language itself as desired. Thus, the visualization provided in the view enables developers to work in the schema language yet maintain semblance of the underlying instance produced by the schema. Since most developers are familiar with the instance document or file, the visualization facilitates more efficient software development.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 4 illustrates a prior art representation of an XSD file that describes the instance document depicted in FIG. 3.

FIG. 5 illustrates a simplified graphical representation that provides a viewing structure similar in graphical form to the instance document depicted in FIG. 3.

FIG. 6 illustrates an alternative simplified graphical representation that provides a viewing structure similar in graphical form to the instance document depicted in FIG. 3.

FIG. 7 illustrates an exemplary XML instance file.

DETAILED DESCRIPTION

A software development system and method are provided. The system includes a transform component to convert a schema file into a simplified graphical data representation that coincides with a data representation associated with an underlying instance document. A viewing component displays the simplified graphical data representation. The transform component can be provided as part of an integrated development environment (IDE) to facilitate design of XML schemas and files. The method includes loading a schema file into a first data structure and transforming the first data structure into a second data structure, where the second data structure provides a view that coincides graphically with a shape of an instance document. The instance document can be an XML file, for example and the first data structure can be an XSD file, for example.

As used in this application, the terms "component," "transform," "schema," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g. data from one component interacting with another component in a local system, distributed system, and/or across a network such as the Internet with other systems via the signal).

Figure 1:
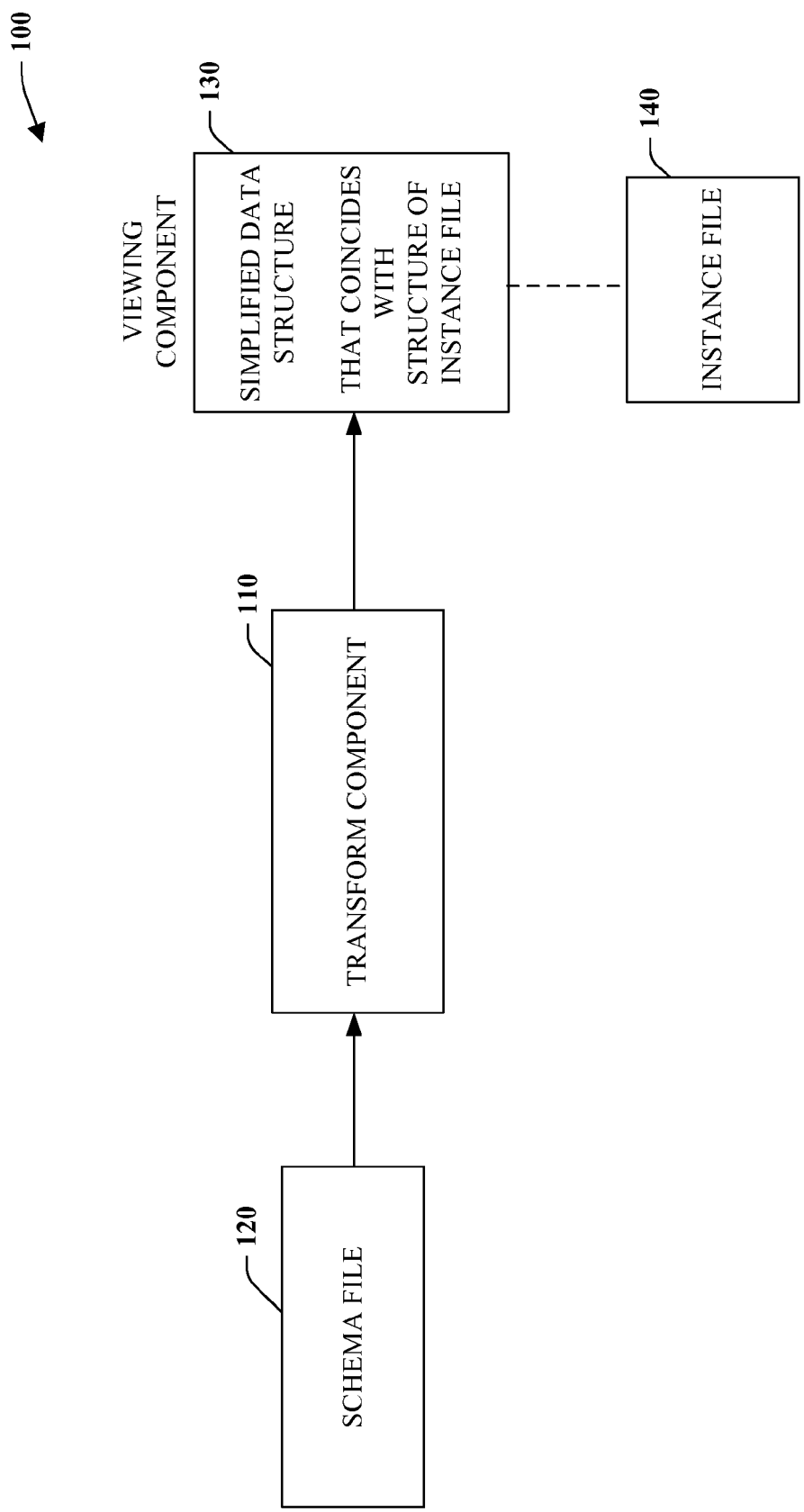
FIG. 1 is a schematic block diagram illustrating a data transform and development system.

Referring initially to FIG. 1, a data transform and development system 100 is illustrated. The system 100 includes a transform component 110 that inputs a schema file 120 or first data structure and transforms or converts the schema file to a simplified or second data structure at a viewing component 130. The viewing component 130 can be provided as part of a development system interface that operates the transform component 110 and processes the schema file 120. The transform of the schema file 120 is to provide a view of a schema that is structured or shaped for viewing in a form that is similar or mirrors the structure of a related instance file 140, where the instance file is the actual code representation that is produced from the processing of the schema file 120 in a schema language. For example, the schema file 120 could be an XSD file and the instance file 140 could be an XML file. Thus, the transform component 110 converts a representation of the schema file 120 so it correlates to and appears graphically in nature to an underlying representation or structure of the instance file 140 when viewed at 130.

In one aspect, the system 100 provides a developer tool and interface that transforms or converts data in one representation to a simplified data view at 130 that is structured to data associated with the underlying instance document 140. Although the instance document 140 is not operated upon by the transform component 110, the view of the schema file 120 provided at 130 coincides or has a shape that is similar in nature to the instance document 140. The viewing component 130 provides a graphical representation of data in a schema format, for example, that mirrors the shape of XML data the schema 120 describes. This provides a simplified view of the schema 120 by removing extraneous details (i.e., visual "noise") relating to the XML Schema language. By simplifying the view in this manner, a developer can quickly observe an overview of what the XML Schema 120 describes, and easily work with the nuances of the XML Schema language itself as needed. Thus, the visualization provided in the view at 130 enables developers to work in the schema language yet maintain semblance or appearance of the underlying instance produced by the schema 120. Since most developers are familiar with the instance document or file 140, the visualization facilitates more efficient software development.

In another aspect, the system 100 provides a platform for schema development. The system includes means for transforming a schema file (transform component 110) into a simplified graphical data representation that coincides with a data representation associated with an underlying instance document 140. The system also includes means for viewing the simplified graphical data representation (viewing component 130). In one aspect, the system 100 can be provided as part of an Integrated Development Environment (IDE), in one example. An IDE provides a programming environment that has been packaged as an application program, typically consisting of a code editor, a compiler, a debugger, and a graphical user interface (GUI) builder. The IDE may be a standalone application or may be included as part of one or more existing and compatible applications. For instance, the JAVA programming language, for example, can be used within common office applications, which makes it possible to write a JAVA program within the office application. Typically, IDEs provide a user-friendly framework for many modern programming languages, such as Visual Basic, Java, and PowerBuilder, for example. Often, IDEs are employed for developing XML or HTML applications utilized in Web site applications. For example, many developers design Web sites via an IDE application for Web site development that automates many of the tasks involved.

As can be appreciated, various software tools (not shown) can be provided with the system 100 in addition to the transform component 110 and the viewing component 130. Such tools which can be part of an IDE enable developers to design XML document instances, Schemas, such as DTDs, Schematron, or XML Schemas (XSD), XSLT for transformations, XSL-FO for prepress applications, XLink and XPath expressions, various queries using any of a range of querying languages or grammars, CSS stylesheets, Scripts (e.g., Perl, Python, Omnimark, and so forth), as well as other software components for example.

The software tools provide graphical user interfaces around the files and fragments that come out of the end of the development effort, and can include a Schema editor, an XSLT editor, a Stylesheet editor, and one or more Script development tools, for example. The IDE that supports such tools provides an infrastructure that can include a Parser, an XSLT transformation engine, a Browser, an XML (document) editor among other features. The development environment should enable applications to work with accepted standards, such as W3C XML, DOM3, and SAX, for example. Other tools that can be provided include data content management systems, systems or components for data-binding XML into Java classes (or other bindings), a Web application server, and Web services development tools, for example.

Before proceeding it is noted that the system components and tools described above can be provided as part of a Graphical User Interface (GUI) to interact with the user or other components such as any type of application that sends, retrieves, processes, and/or manipulates data, receives, displays, formats, and/or communicates data, and/or facilitates operation of the system. For example, such interfaces can also be associated with an engine, server, client, editor tool or web browser although other type applications can be utilized.

The GUI can include a display having one or more display objects (not shown) for manipulating data including such aspects as configurable icons, buttons, sliders, input boxes, selection options, menus, tabs and so forth having multiple configurable dimensions, shapes, colors, text, data and sounds to facilitate operations with the profile and/or the device. In addition, the GUI can also include a plurality of other inputs or controls for adjusting, manipulating, and configuring one or more aspects. This can include receiving user commands from a mouse, keyboard, speech input, web site, remote web service and/or other device such as a camera or video input to affect or modify operations of the GUI. For example, in addition to providing drag and drop operations, speech or facial recognition technologies can be employed to control when or how data is presented to the user. The data can be updated and stored in substantially any format although formats such as XML can be employed to capture user controls and instructions.

Figure 2:
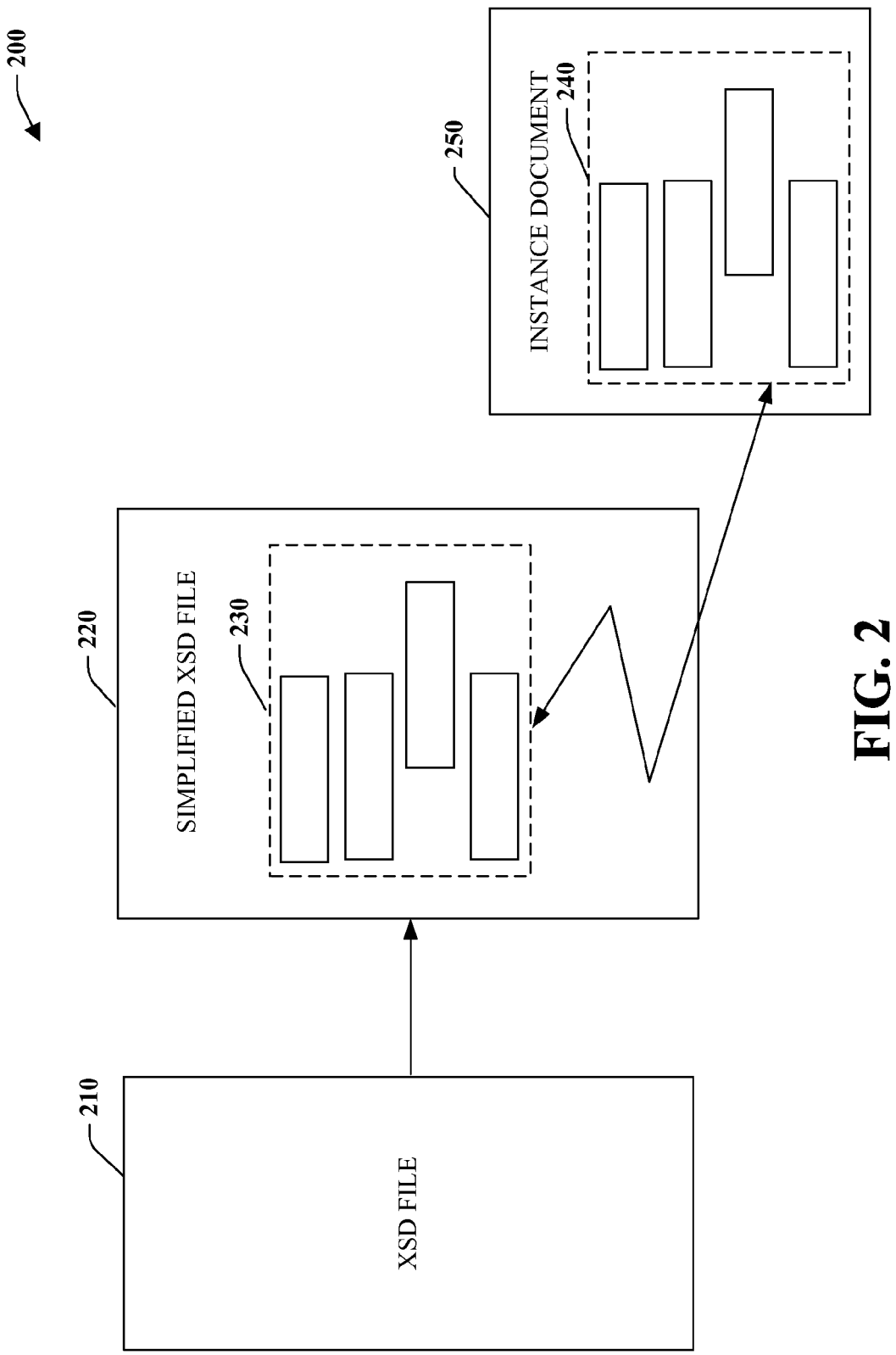
FIG. 2 illustrates and example transform on an XSD file representation into a simplified XSD file representation that conforms to an underlying XML instance document.

Referring now to FIG. 2, a system 200 illustrates an example transform on an XSD file representation into a simplified XSD file representation that conforms to an underlying XML instance document. The system 200 includes an XSD file 210 that is transformed into a simplified format of XSD 220. Such transforms or conversions in into the simplified data form 220 can be provided in accordance with the components and tools described above with respect to FIG. 1. The XSD file 210 is an XML-based language that defines validation rules for XML files. The acronym XSD stands for XML Schema Definition, where XML represents Extensible Markup Language. Generally, XSD is an XML based-language, meaning than XSD statements will be written in XML files. In one aspect, XSD defines validation rules for XML files, meaning that XSD can be used to replace DTD, which is another language for defining XML validation rules.

As shown, the simplified format of XSD 220 has a graphical form 230 that conforms, resembles, or mirrors a data form 240 represented in an XML instance document 250. The XML schema represented by the XSD file 210 is typically a single file or collection of files that serve as the framework for defining the data content, format, and structure of an XML document. A well-written schema expresses agreed upon vocabularies and allows computers to validate the data against the rules written to describe the data. The schema provides a means for defining the structure and content of XML documents. While a schema describes the content and structure of an XML document, the XML instance document 250 includes the actual data. The schema represented by the XSD 210, and instance document 250, are generally separate where the instance document is frequently validated against the schema to ensure the contents and structure are correct. It is to be appreciated that although these examples show a transform from an XSD format 210 to a simplified format 220 which represents an XML instance 250, that other transforms are possible. For example, a schema 210 could be represented in another language than XSD that conforms graphically in structure to data that is some other format than XML employed in the instance document 250. Thus, substantially any type of transform that converts data in a schema format to graphically conform to an underlying instance format can be employed.

It is noted that the graphical form 230 that conforms to the structure 240 provides a structure that is simplified in nature having less XSD language constructs visible and organized to resemble the form 240. Such resemblance, conformance, or mirroring can take on many forms. This can include providing the simplified form 230 with similar types of indentations, component organizations, component orderings, or other component alignments that make viewing of the simplified format of XSD 220 to appear in a similar structural form as the instance document 250. This can also include removing (from the developers view but not from the file 210) language nuances such as complex type declaration statements or other statements that tend to obscure the visual structure of the instance document 250. In general, developers have a working knowledge of the structure of the instance document 250 but are constrained by the language in the XSD file 210 to generate the structure. By providing the transform to the simplified form 220, developers can appreciate the underlying visual structure of the instance form 240 yet still develop applications that utilize the schema language represented in this example by the XSD file 210.

In another aspect that is described in more detail below with respect to FIG. 6, components such as compositors can be displayed in the simplified form 230 representing an alternative view. The compositors are presented outside of the underlying graphical structure and hint at more of the complexities of the XSD language while still allowing developers to view the simplified form 230. A compositor, which describes the composition of a type's content, are also known as its content model. An XML Schema typically defines three compositors that can be used in complex type definitions including xsd:sequence, xsd:choice, and xsd:all, for example. Compositors can include particles, which also includes components such as other compositors, element declarations, wildcards, and model groups. Attribute declarations are not considered particles because they don't repeat. Hence, attribute declarations are not placed within a compositor but after the compositor at the end of a complex type definition, for example.

Figure 3:
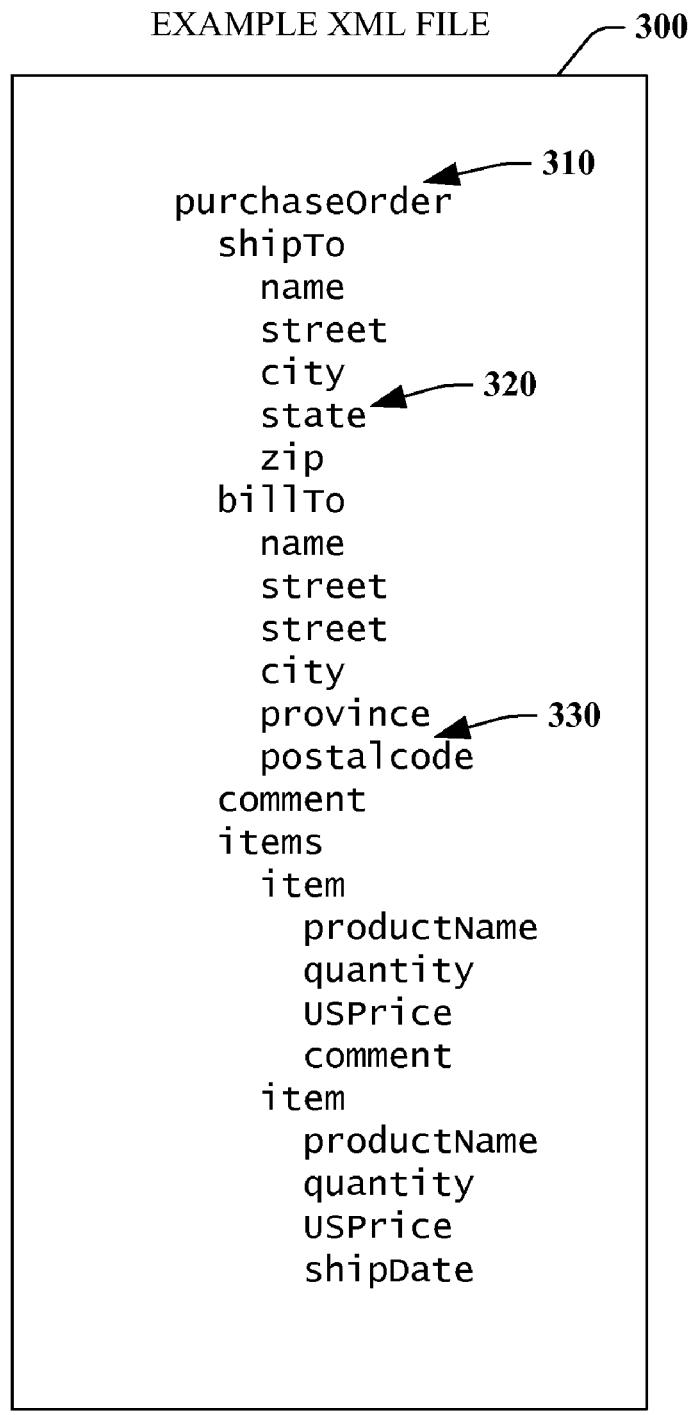
FIG. 3 illustrates an exemplary XML instance file.

Referring now to FIGS. 3 and 4 collectively, an example transform is illustrated. FIG. 3 illustrates an exemplary XML instance file 300 whereas FIG. 4 illustrates a prior art representation of an XSD file 400 that describes the instance document depicted in FIG. 3. It is to be appreciated that the following examples are shown for illustrative purposes and that the code examples shown are but one possible configuration. As can be appreciated, a plurality of applications can be designed that are different than the specific example code fragments shown.

FIG. 3 illustrates an example instance document having XML elements that are nested as the following XML example:

```
po.xml
purchaseOrder    (see reference numeral 310)
   shipTo
      name
      street
      city
      state    (see reference numeral 320)
      zip
   billTo
      name
      street
      street
      city    (see reference numeral 330)
      province
```

```
            postalcode
          comment
          items
             item
                productName
                quantity
                USPrice
                comment
             item
                productName
                quantity
                USPrice
                shipDate
```

The nesting illustrated in the file 300 reflects the structure of the data—e.g., this purchase order has ship-to & bill-to addresses, a comment, and a list of items each with name, quantity, price, and so forth. However if the accompanying XML Schema file is observed, (po.xsd), the following example structure 400 is provided in prior art FIG. 4:

```
schema
   annotation
      documentation
   element purchaseOrder(of type PurchaseOrderType)
(see reference numeral 410)
   element comment(of type string)
   complexType PurchaseOrderType          (see reference numeral 420)
      sequence
         element shipTo(of type Address)
         element billTo(of type Address)
         element comment(of type ref)
         element items(of type Items)
      attribute orderDate
   complexType Address                    (see reference numeral 430)
      sequence
         element name(of type string)
         element street(of type string)
         element city(of type string)
         choice                           (see reference numeral 440)
            sequence
               element province(of type string)
               element postalcode(of type string)
            sequence
               element county (of type string)
               element postcode (of type string)
            sequence
               element state(of type string)
               element zip(of type positiveInteger)
      attribute country
   complexType Items                      (see reference numeral 450)
      sequence
         element item
            complexType                   (see reference numeral 460)
               sequence
                  element productName(of type string)
                  element quantity
                     simpleType
                        restriction(of type positiveInteger)
                           maxExclusive
                  element USPrice(of type decimal)
                  element comment(of type ref)
                  element shipDate(of type date)
               attribute partNum(of type SKU)
   simpleType SKU
      restriction(of type string)
         pattern
```

In this example, the structure of the purchase order XML file 300 is not mirrored in the XML schema file 400 that describes it. For example, the description of a purchaseOrder element 310 in FIG. 3 is split across the XML schema definitions shown at reference numerals 410, 420, 430, and 450 of FIG. 4. Furthermore, each nested sequence, choice, or all compositor adds one level of indentation to the leaf elements province, postalcode, county, postcode, state, and zip in the XML schema definition shown at reference numeral 440. However, in the purchase order XML file 300, these elements are immediate children of shipTo and billTo and are at the same (or similar) indention level as sibling elements name, street, and city shown at reference numerals 320 and 330. Generally, existing tools render the XML schema structures 410-450 as separate graphical elements with lines or boxes reflecting the relationships between them, which obscure the structure contained in the file 300 of FIG. 3. Existing tools render the indentation level of elements to match the source XML schema rather than the indentation level of the target xml instance document.

Turning to FIG. 5, a simplified graphical representation 500 provides a viewing structure similar in graphical form to the instance document depicted in FIG. 3. The prior art structure depicted in FIG. 2 is transformed in to the structure of FIG. 5 by expanding type definitions and references in-line and by aligning sibling elements at the same (or similar) indentation level to more accurately reflect the shape of the XML data depicted in FIG. 3. For example, if the user desired to render the purchaseOrder element, a graphical view with the following structure can be displayed as shown in FIG. 5:

Simplified XML Schema structure:

```
element purchaseOrder(of type PurchaseOrderType)
   attribute orderDate
   element shipTo(of type Address)        (see reference numeral 510)
      element name(of type string)
      element street(of type string)
      element city(of type string)
      element province(of type string)    (see reference numeral 520)
      element postalcode (of type string)
      element county(of type string)      (see reference numeral 530)
      element postcode(of type string)
      element state(of type string)       (see reference numeral 540)
      element zip(of type positiveInteger)
   element billTo(of type Address)        (see reference numeral 550)
      element name(of type string)
      element street(of type string)
      element city(of type string)
      element province(of type string)
      element postalcode (of type string)
      element county(of type string)
      element postcode(of type string)
      element state(of type string)
      element zip(of type positiveInteger)
   element comment(of type string)        (see reference numeral 560)
   element items(of type Items)
      element item (sequence)             (see reference numeral 570)
         attribute partNum(of type SKU)
         element productName(of type string)
         element quantity (restricted to positiveInteger)
         element USPrice(of type decimal)
         element comment (optional, of type string)
         element shipDate (optional, of type date)
```

In general, the Address complex type that describes the shape of the shipTo & billTo elements is in-lined where it is used at reference numerals 510 and 530. The nested sequence and choice compositors from 440 of FIG. 4 are hidden such that elements province, postalcode, county, postcode, state, & zip are at the same indentation level as sibling elements name, street, and city as illustrated at reference numerals 520 through 540 of FIG. 5. The anonymous type defined at 460 of FIG. 4 is in-lined directly into reference numeral 560, and the comment elements at reference numerals 560 and 570 have the respective string type in-lined.

Overall, the shape of the structure shown in the representation 500 retains the desired information shown in FIG. 4, while more accurately reflecting the XML data in FIG. 3 and therefore being easier to understand. The rendering in representation 500 hides the respective compositors, but an alternate rendering which reveals the compositors and still preserves the indentation rules described above is shown in FIG. 6.

Referring to FIG. 6, an alternative simplified graphical representation 600 is illustrated that provides a viewing structure similar in graphical form to the instance document depicted in FIG. 3. Compositors such as sequence and choice are illustrated at 610 and 620 respectively. These are shown in a different graphical orientation so as to still maintain the underlying form of the instance document. The alternative graphical representation 600 appears as follows:

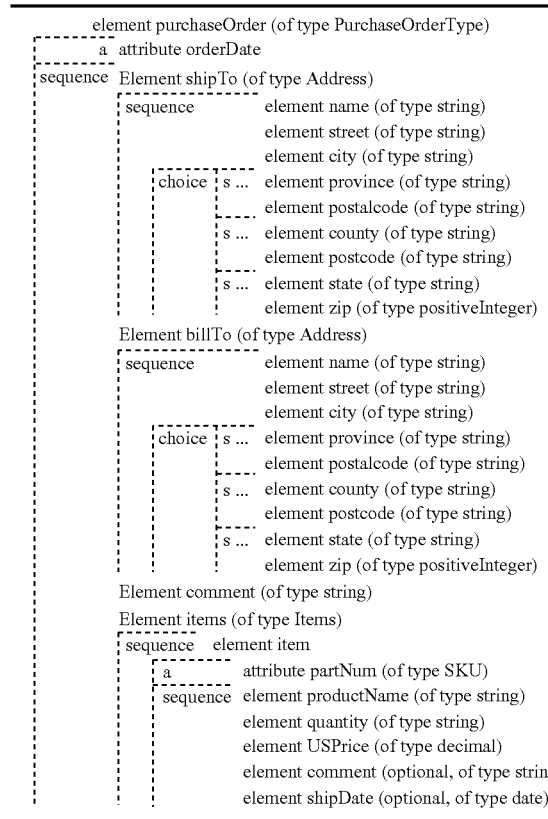

Referring to FIG. 7, another example XML document 700 is shown for illustrative purposes. The document 700 shows an alternative example to the file 200 shown above in FIG. 3 and represents a full purchase order listing as follows.

```
<?xml version="1.0"?>
<purchaseOrder orderDate="1999-10-20">
    <shipTo>
        <name>Alice Smith</name>
        <street>123 Maple Street</street>
        <city>Mill Valley</city>
        <state>CA</state>
        <zip>90952</zip>
    </shipTo>
    <billTo>
        <name>Robert Smith</name>
        <street>8 Oak Avenue</street>
        <street>Apt. #3-A</street>
```

-continued

```
        <city>Old Town</city>
        <province>BC</province>
        <postalcode>V6B 1H6</postalcode>
    </billTo>
    <comment>Hurry, my lawn is going wild!</comment>
    <items>
        <item partNum="872-AA">
            <productName>Lawnmower</productName>
            <quantity>1</quantity>
            <USPrice>148.95</USPrice>
            <comment>Confirm this is electric</comment>
        </item>
        <item partNum="926-AA">
            <productName>Baby Monitor</productName>
            <quantity>1</quantity>
            <USPrice>39.98</USPrice>
            <shipDate>1999-05-21</shipDate>
        </item>
    </items>
</purchaseOrder>
```

The following code example shows again a prior art representation of the XSD data associated with the file 700 that has not been processed into simplified graphical form via the transform components described above. As can be observed, the file dose not maintain similar indentations or other structural similarity to the underlying instance file 700.

```
<xsd:schema xmlns:xsd="http://www.w3.org/2001/XMLSchema">
    <xsd:annotation>
        <xsd:documentation xml:lang="en">
            Purchase order schema for Example.com.
            Copyright 2000 Example.com. All rights reserved.
        </xsd:documentation>
    </xsd:annotation>
    <xsd:element name="purchaseOrder" type="PurchaseOrderType"/>
    <xsd:element name="comment" type="xsd:string"/>
    <xsd:complexType name="PurchaseOrderType">
        <xsd:sequence>
            <xsd:element name="shipTo" type="Address"/>
            <xsd:element name="billTo" type="Address"/>
            <xsd:element ref="comment" minOccurs="0"/>
            <xsd:element name="items" type="Items"/>
        </xsd:sequence>
        <xsd:attribute name="orderDate" type="xsd:date"/>
    </xsd:complexType>
    <xsd:complexType name="Address">
        <xsd:sequence>
            <xsd:element name="name" type="xsd:string"/>
            <xsd:element name="street" type="xsd:string" minOccurs="1" maxOccurs="3"/>
            <xsd:element name="city" type="xsd:string"/>
            <xsd:choice>
                <xsd:sequence>
                    <xsd:annotation>
                        <xsd:documentation>Canadian address
                        </xsd:documentation>
                    </xsd:annotation>
                    <xsd:element name="province" type="xsd:string"/>
                    <xsd:element name="postalcode" type="xsd:string"/>
                </xsd:sequence>
                <xsd:sequence>
                    <xsd:annotation>
                        <xsd:documentation>Great Britian address
                        </xsd:documentation>
                    </xsd:annotation>
                    <xsd:element name="county" type="xsd:string"/>
                    <xsd:element name="postcode" type="xsd:string"/>
                </xsd:sequence>
                <xsd:sequence>
                    <xsd:annotation>
                        <xsd:documentation>United States address
                        </xsd:documentation>
                    </xsd:annotation>
                    <xsd:element name="state" type="xsd:string"/>
```

-continued

```
        <xsd:element name="zip" type="xsd:positiveInteger"/>
      </xsd:sequence>
    </xsd:choice>
  </xsd:sequence>
</xsd:complexType>
<xsd:complexType name="Items">
  <xsd:sequence>
    <xsd:element name="item" minOccurs="0"
          maxOccurs="unbounded">
      <xsd:complexType>
        <xsd:sequence>
          <xsd:element name="productName" type="xsd:string"/>
          <xsd:element name="quantity">
            <xsd:simpleType>
              <xsd:restriction base="xsd:positiveInteger">
                <xsd:maxExclusive value="100"/>
              </xsd:restriction>
            </xsd:simpleType>
          </xsd:element>
          <xsd:element name="USPrice" type="xsd:decimal"/>
          <xsd:element ref="comment" minOccurs="0"/>
          <xsd:element name="shipDate" type="xsd:date"
            minOccurs="0"/>
        </xsd:sequence>
        <xsd:attribute name="partNum" type="SKU"
            use="required"/>
      </xsd:complexType>
    </xsd:element>
  </xsd:sequence>
</xsd:complexType>
<!-- Stock Keeping Unit, a code for identifying products -->
<xsd:simpleType name="SKU">
  <xsd:restriction base="xsd:string">
    <xsd:pattern value="\d{3}-[A-Z]{2}"/>
  </xsd:restriction>
</xsd:simpleType>
    </xsd:schema>
```

Figure 8:
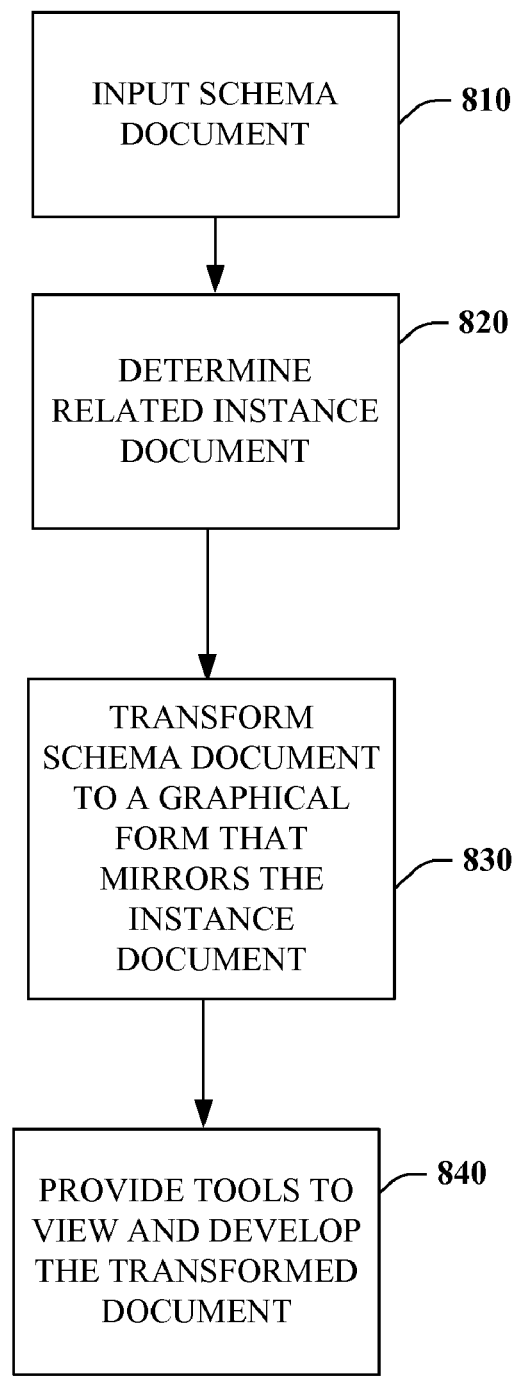
FIG. 8 illustrates an exemplary process for transforming data to a simplified graphical representation.

FIG. 8 illustrates an exemplary process 800 for transforming data to a simplified graphical representation. While, for purposes of simplicity of explanation, the process is shown and described as a series or number of acts, it is to be understood and appreciated that the subject processes are not limited by the order of acts, as some acts may, in accordance with the subject processes, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject processes described herein.

Proceeding to 812 of FIG. 8, a schema file or document is received for processing. The schema file can be an XSD structure that describes a related XML instance file. As noted above, other types of transforms are possible where an input file in a more complicated format is transformed to coincide with a graphical structure in a different format. At 820, the structure of an underlying XML instance document is determined. This can include processing components in the XSD file to determine what resultant components may appear an instance or XML file. This can also include processing one or more transformation rules for how to format an XSD file to have a similar structure to an instance XML file. At 830, a transform is performed on the schema document received at 810 in order to generate a simplified graphical structure in XSD format that mirrors or conforms to an instance structure in XML format. At 840, the transformed file is associated with other tools such as and editor and a viewer where further document development can occur employing the simplified graphical structure.

Figure 9:
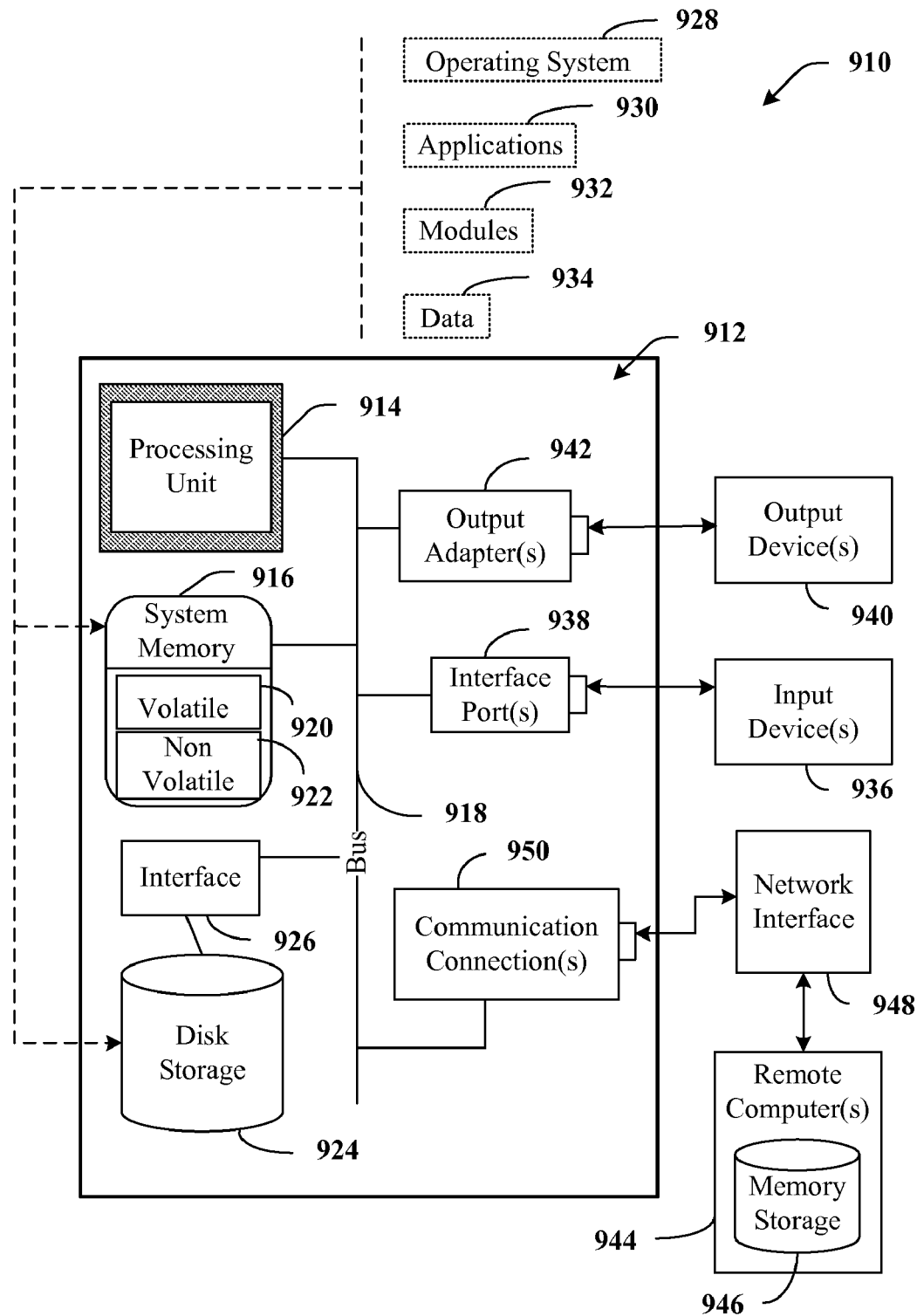
FIG. 9 is a schematic block diagram illustrating a suitable operating environment.
Figure 10:
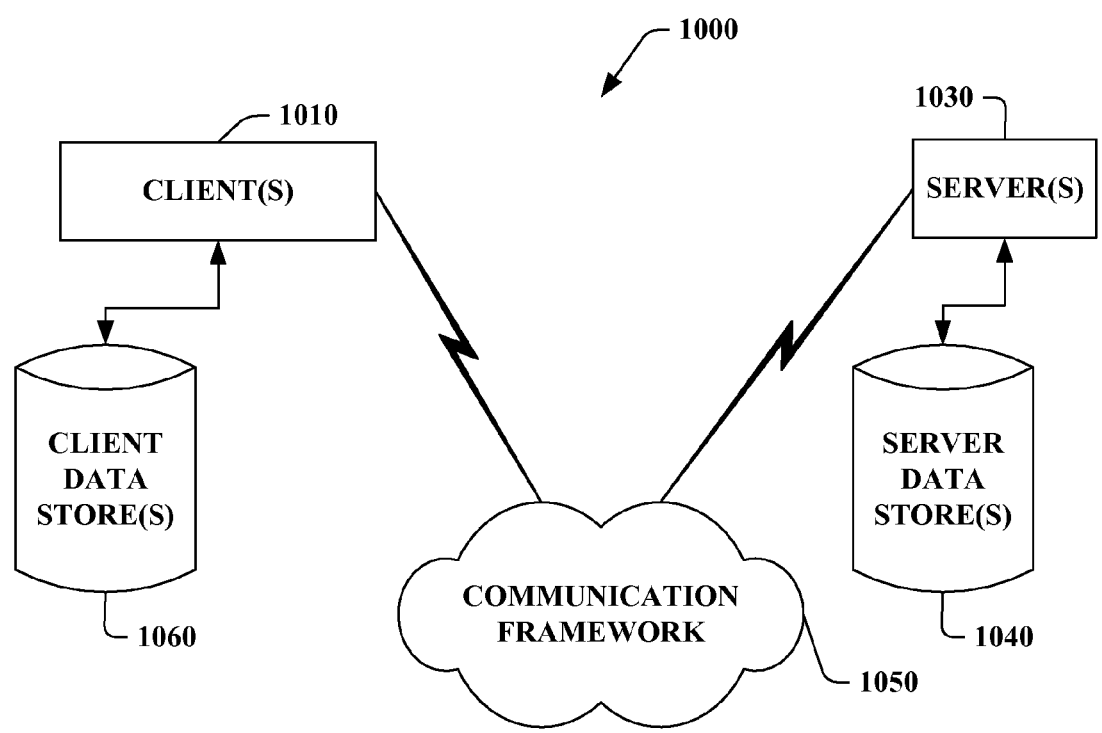
FIG. 10 is a schematic block diagram of a sample-computing environment.

In order to provide a context for the various aspects of the disclosed subject matter, FIGS. 9 and 10 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the invention also may be implemented in combination with other program modules. Generally, program modules include routines, programs, components, data structures, etc. that performs particular tasks and/or implements particular abstract data types. Moreover, those skilled in the art will appreciate that the inventive methods may be practiced with other computer system configurations, including single-processor or multi-processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 9, an exemplary environment 910 for implementing various aspects described herein includes a computer 912. The computer 912 includes a processing unit 914, a system memory 916, and a system bus 918. The system bus 918 couple system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 64-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/non-volatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that various components described herein can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912 and to output information from computer 912 to an output device 940. Output adapter 942 is provided to illustrate that there are some output devices 940 like monitors, speakers, and printers, among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

FIG. 10 is a schematic block diagram of a sample-computing environment 1000 that can be employed. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g. threads, processes, computing devices). The servers 1030 can house threads to perform transformations by employing the components described herein, for example. One possible communication between a client 1010 and a server 1030 may be in the form of a data packet adapted to be transmitted between two or more computer processes. The system 1000 includes a communication framework 1050 that can be employed to facilitate communications between the client(s) 1010 and the server(s) 1030. The client(s) 1010 are operably connected to one or more client data store(s) 1060 that can be employed to store information local to the client(s) 1010. Similarly, the server(s) 1030 are operably connected to one or more server data store(s) 1040 that can be employed to store information local to the servers 1030.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A software development system including at least one processor, the software development system comprising:
   a transform component configured to convert a schema file into a simplified graphical data representation that coincides with a data representation associated with an underlying instance document; and
   a viewing component configured to display the simplified graphical data representation,
   wherein the simplified graphical data representation maintains indentations that correspond to the data representation associated with the underlying instance document, and
   wherein the viewing component is further configured to display a layered set of compositor elements in a view of the simplified graphical data representation including in-line expanded type definitions and references in-line, and aligned sibling elements at an indentation level that reflects a shape of the underlying instance document.

2. The software development system of claim 1, wherein the transform component is configured to convert the schema file into the simplified graphical data representation at least in part by removing language constructs present in the schema file from the display of the viewing component.

3. The software development system of claim 1, wherein the underlying instance document is associated with an Extensible Markup Language (XML).

4. The software development system of claim 1, further comprising a component configured to remove compositor elements from a display representation of the simplified graphical data representation.

5. The software development system of claim 4, further comprising a control component configured to display the compositor elements in the simplified graphical data representation.

6. The software development system of claim 1, wherein the transform component is configured to expand one or more type definitions and type references in-line.

7. The software development system of claim 6, wherein the transform component is configured to align sibling elements at an indentation level that reflects a shape of an underlying instance document.

8. The software development system of claim 6, further comprising a component configured to align anonymous types.

9. The software development system of claim 6, further comprising a component configured to align string types.

10. The software development system of claim 1, wherein the transform component and the viewing component are provided as part of an Integrated Development Environment (IDE).

11. The software development system of claim 10, wherein the IDE is configured to provide one or more graphical user interfaces to operate the transform component and the viewing component.

12. The software development system of claim 11, wherein the IDE is configured to provide controls for displaying or hiding compositor elements in the simplified graphical data representation.

13. A schema design method performed by a processor, the schema design method comprising:
    loading a schema file into a first data structure;
    transforming the first data structure into a second data structure;
    providing, in the second data structure, a graphical view that visually coincides with a shape of an instance document;
    determining graphical indentations that correspond to a data representation associated with an underlying instance document; and
    displaying, in a simplified graphical data representation including the graphical indentations, layers of compositor elements within the graphical indentations including in-line expanded type definitions, and references in-line, and aligned sibling elements at an indentation level that reflects the shape of the instance document.

14. The schema design method of claim 13, further comprising associating the first data structure with an Extensible Markup Language (XML) Schema Development Language (XSD) and mirroring an Extensible Markup Language (XML) data structure in the second data structure.

15. The schema design method of claim 13, further comprising hiding compositor elements from a display representation of the second data structure.

16. The schema design method of claim 15, further comprising displaying the compositor elements in the second data structure.

17. The schema design method of claim 15, further comprising displaying the compositor elements at a different display orientation from other XSD components.

18. A computer-readable storage medium storing instructions executable by a computing device to perform operations comprising:
    transforming a schema file into a simplified graphical data representation that coincides with a data representation associated with an underlying instance document;
    including indentations corresponding to the data representation in the simplified graphical representation; and
    displaying a layered set of compositor elements in a view of the simplified graphical data representation including in-line expanded type definitions and references in-line, and aligned sibling elements at an indentation level that reflects a shape of the underlying instance document.

* * * * *